United States Patent [19]

Chiu

[11] Patent Number: 5,002,296

[45] Date of Patent: Mar. 26, 1991

[54] DRIVING DEVICE FOR BICYCLE

[76] Inventor: Ying-Tung Chiu, No. 605, Ta-She Tsun, Hsin-Shih Hsiang, Tainan Hsien, Taiwan

[21] Appl. No.: 512,405

[22] Filed: Apr. 23, 1990

[51] Int. Cl.$^5$ ............................................. B62M 11/02
[52] U.S. Cl. ...................................... 280/260; 280/262; 74/67; 74/421 R; 74/594.2
[58] Field of Search ............... 280/257, 259, 260, 262; 74/67, 421 R, 594.2

[56] References Cited

U.S. PATENT DOCUMENTS

| | | | |
|---|---|---|---|
| 616,665 | 12/1898 | Hartzell | 74/67 |
| 630,093 | 8/1899 | Noar | 74/67 |
| 1,332,709 | 3/1920 | Chrobak | 280/260 |
| 4,662,644 | 5/1987 | Nelson | 280/214 |

FOREIGN PATENT DOCUMENTS 24824 of 1895 United Kingdom ................ 280/259

Primary Examiner—Charles A. Marmor
Assistant Examiner—Mitchell Bompey
Attorney, Agent, or Firm—Morton J. Rosenberg; David I. Klein

[57] ABSTRACT

A driving device without chain for bicycle comprises a driving wheel mounted to a crank shaft, a rear gear mounted to a wheel hub for mounting a rear wheel of the bicycle, an input gear coupled with the driving wheel by means of an interconnecting link and a gear set having two identical gears respectively engaging the rear gear and the input gear.

2 Claims, 4 Drawing Sheets

DRIVING DEVICE FOR BICYCLE

BACKGROUND OF THE INVENTION

This invention relates to a driving device for a bicycle, and more particular to a driving device without driving chain for the bicycle.

Conventionally, front and rear gears and a driving chain build up a driving device for a bicycle. The driving device includes a front gear comprising one or more sprockets mounted to a crank shaft, a rear gear comprising one or more sprockets mounted to a rear hub, and a driving chain stretched across both the front and rear gears. In riding, the driving chain is maintained across the front and rear gears under pressure in upper portion and loosely in lower portion thereof that may render the front gear to slip under some circumstances such as struggling up along a slope and the driving chain to disengage and thus separate from the gears. To this end, the inventor has attempted to provide an inventive driving device without a driving chain for a bicycle to overcome the drawbacks of known driving devices.

SUMMARY OF THE INVENTION

An object to this invention is to provide an improved driving device for a bicycle which can diminish the disadvantages of known driving device.

It is another object of this invention to provide an improved driving device with a driving chain for a bicycle.

With the above object in view, this invention provide an improved driving device for bicycle which comprises a driving wheel mounted to a crank shaft, a rear gear mounted to a wheel hub for mounting a rear wheel of the bicycle, an input gear coupled with the driving wheel by means of an interconnecting link and a gear set having two identical gears journaled to two ends of a shaft and respectively engaging the rear gear and the input gear.

BRIEF DESCRIPTION OF THE DRAWINGS

The present preferred exemplary embodiment will be described in detail with respect to the following drawings, wherein.

DETAILED DESCRIPTION OF THE PREFERRED EMBODIMENT

Figure 1:
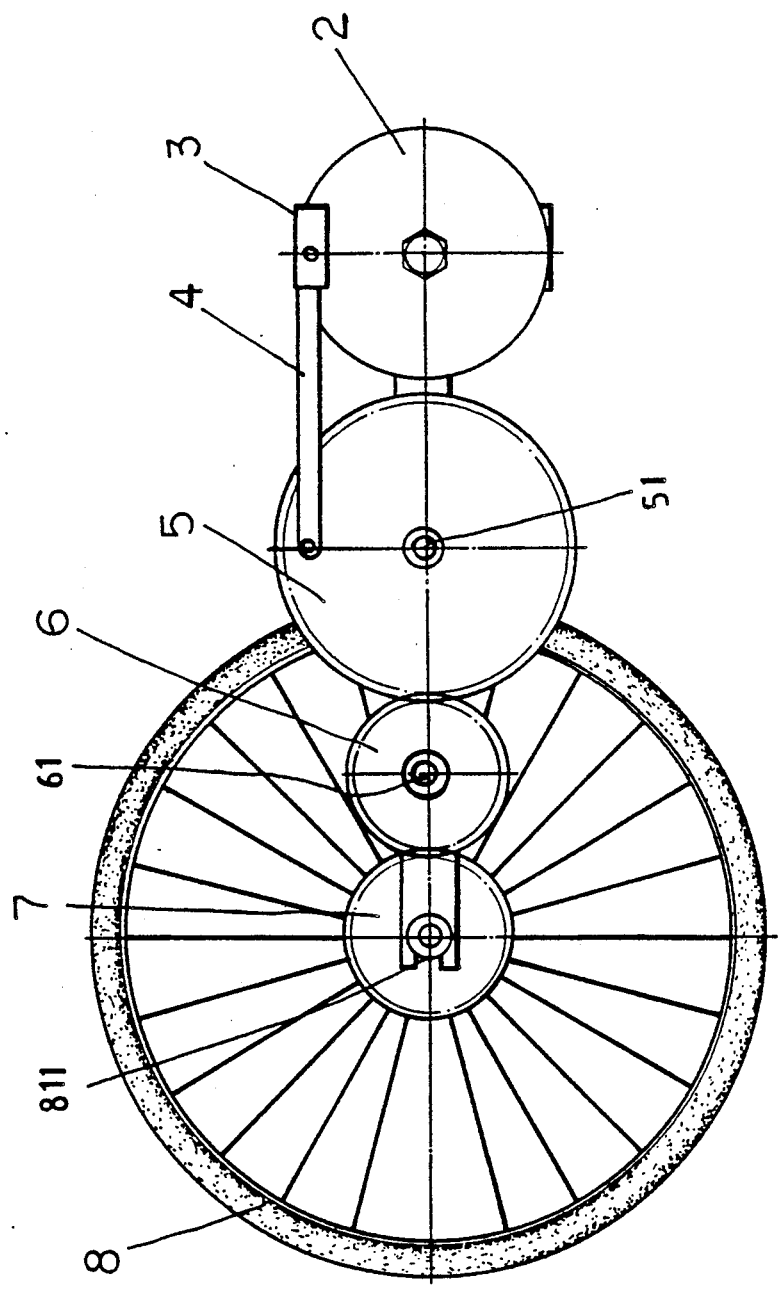
FIG. 1 is a side elevational view of the preferred embodiment of the present invention.

Referring now to FIG. 1, an improved driving device for bicycle according to this invention comprises a driving wheel 2 and three gears 5, 6, 7 sequentially engaged with respect to each other and including an input gear 5 rotatably mounted to a stub shaft 51, a rear gear 7 mounted to a rear hub 811 and an output gear set 6 rotatably mounted to a stub shaft 61 and interengaging the input gear 5 and the rear gear 7. Said driving wheel 2 is mounted to a crank 3 and coupled with the input gear 5 by means of an interconnecting link 4. The driving wheel 2 drives gear series including input gear 5, output gear set 6 and rear gear 7 causing rotation of a bicycle rear wheel 8.

Figure 2:
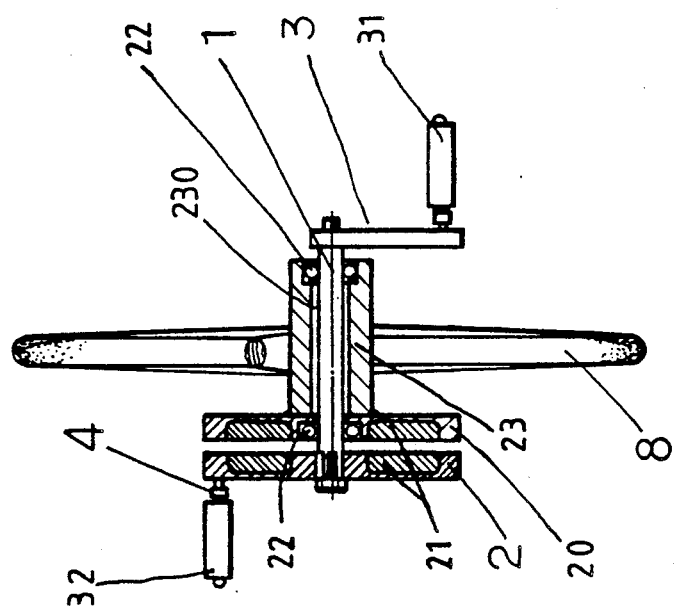
FIG. 2 is a cross-sectional view of the front gear of the driving device shown in FIG. 1.
Figure 3:
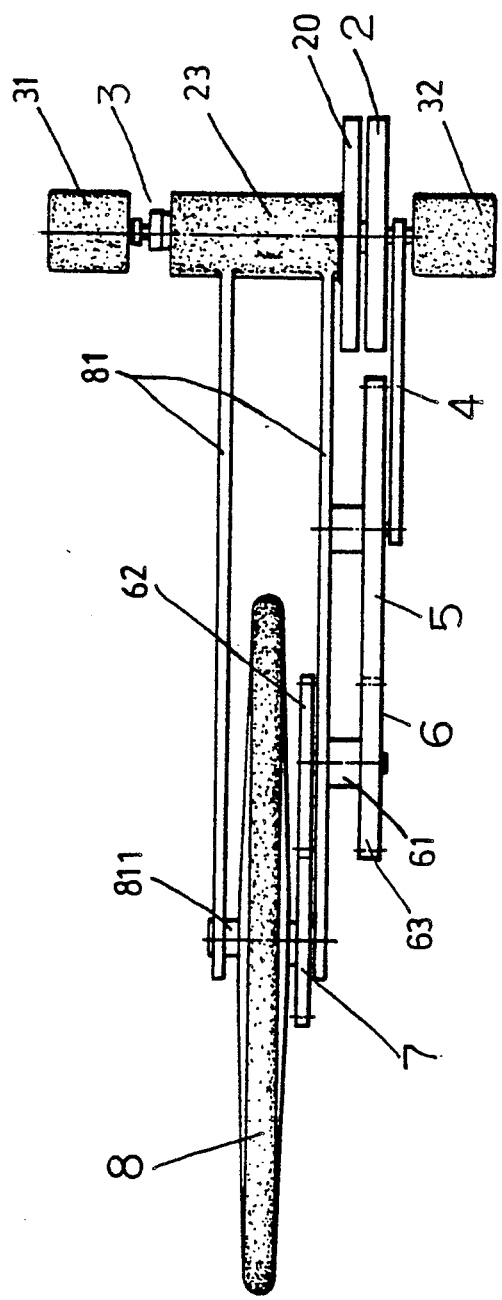
FIG. 3 is a top elevational view of the driving device according to this invention.
Figure 4:
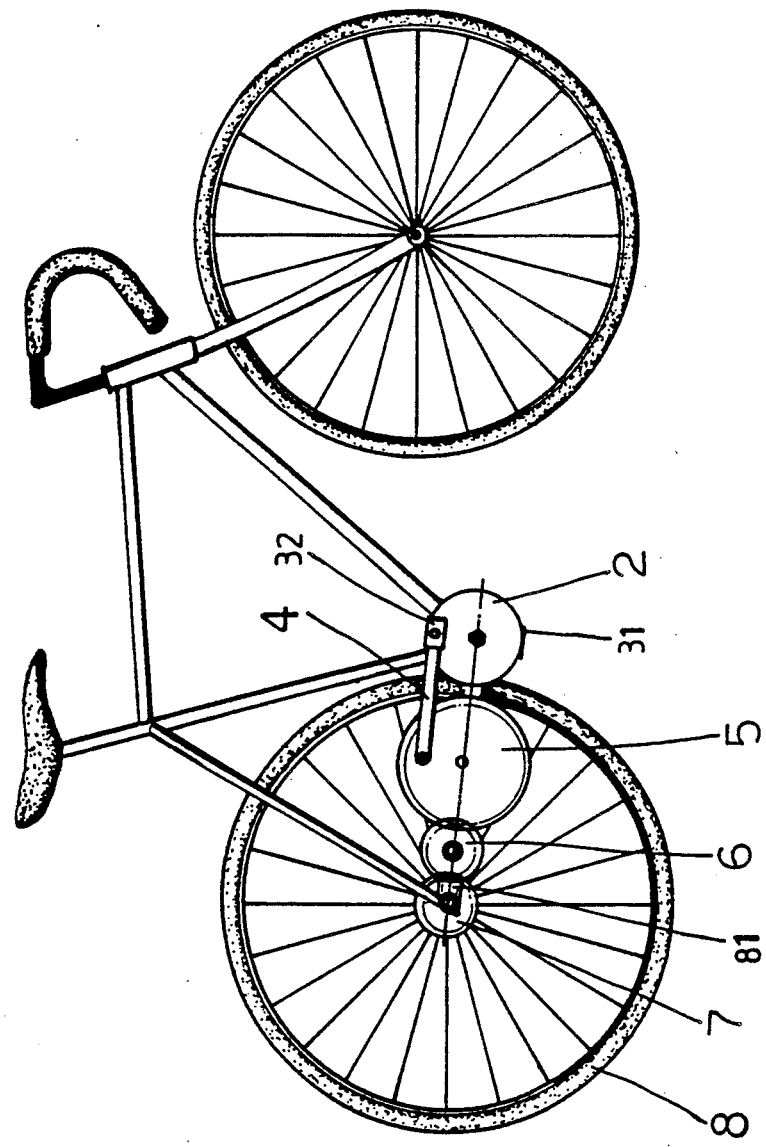
FIG. 4 is a diagramatic side view of a bicycle mounted with a driving device of this invention.

As shown in FIGS. 2, 3, and 4, the bicycle has a frame which is constituted with a pair of spaced and parallel side arms 81 with front ends thereof joined with a crank hub 23 and rear ends joined with rear hub 811 of free in rotation for mounting the rear wheel 8. The crank hub 23 is formed with a bore 230 running transversely and inserted with two ball bearings 22 in two end portions for rotatably receiving the crank shaft 1. One side of the crank hub 23 is integrally formed with an enlarged disc 20 having chambers for fitting magnets 21. One end of the crank shaft 1 horizontally protrudes from the disc 2. Said protruding end of the crank shaft 1 is coaxially and firmly mounted with the driving wheel 2 which is formed with chambers for fitting magnets 21 corresponding to and same in magnetic pole as the magnets 21 in the disc 20. The end of the crank shaft 1 opposite to driving wheel 2 is secured with a L-shaped arm and the first pedal 31. The second pedal 32 is eccentrically mounted on the diving wheel 2 is a diagonal position with respect to the first pedal 31.

Due to the magnetic resistance exerted by magnetic poles of same polarity upon magnets 21 in the chambers of the disc 20 and the driving wheel 2, the bicycle is improved in acceleration.

The output gear set 6 includes two identical gears 62, 63 fixedly journaled to opposite ends of the stub shaft 61 which is journaled for rotation in a bearing (not shown) mounted to one of the side arms 61. One gear 62 of the gear set 6 engages the rear gear 7 while the other gear 63 engages the input gear 5.

In operation, riding the bicycle by stepping the pedals 31, 32 with feet drives the driving wheel 2 causing rotation of the rear wheel 8 through transmission of the gears 5, 62, 63 and 7.

While an embodiment of the invention has been shown and described, the invention is not limited to the specific construction thereof, which is merely exemplified in the specification rather than defined.

What is claimed is:

1. A driving device for a bicycle, which comprises:
   a frame constituted with a pair of spaced and parallel side bars with one ends joined with a crank hub and the other ends joined with wheel hub of free in rotation for mounting a rear wheel;
   bore means running transversely through the crank hub for rotatably receiving a crank shaft, two ends of the crank shaft extending outwardly of the bore means;
   a L-shaped arm attached to one end of the crank shaft and having a first pedal;
   a driving wheel fixedly and coaxially mounted on the other end of the crank shaft;
   a second pedal eccentrically secured to the driving wheel and located diagonally with respect to the first pedal;
   a first stub shaft mounted on one of the side bars;
   a first gear rotatably journaled to the first stub shaft;
   a link means with its two ends connected respectively to the driving wheel and first gear;
   a second gear fixedly mounted to one end of the wheel hub having the rear wheel;
   a second stub shaft rotatably journaled in said one of the side bars with its two ends extending outwardly of said one of the side bars; and a pair of identical gears fixedly mounted on the second stub shaft wherein the gears are mounted on opposite sides of said one of the side bars with one gear of the gear pair engaging the first gear and the other gear of the gear pair engaging the second gear.

2. A driving device for a bicycle as claimed in claim 1 wherein a disc is further provided on one end of the crank hub end and having chambers for fitting magnets and the driving wheel is formed with chambers for fitting magnets corresponding and adjacent to and of same magnetic polarity as the magnets in the disc.

* * * * *